United States Patent [19]

Unterberger

[11] Patent Number: 5,645,899
[45] Date of Patent: Jul. 8, 1997

[54] METHOD AND APPARATUS FOR APPLYING COLOR IDENTIFIERS TO A LEAD

[75] Inventor: Siegfried Unterberger, Coburg, Germany

[73] Assignee: Siemens Aktiengesellschaft, Munich, Germany

[21] Appl. No.: 544,566

[22] Filed: Oct. 18, 1995

[30] Foreign Application Priority Data

Oct. 25, 1994 [DE] Germany .................. 44 38 090.9

[51] Int. Cl.$^6$ ...................................... B05D 3/06
[52] U.S. Cl. .................. 427/558; 118/642; 347/43; 427/58; 427/162
[58] Field of Search .................. 101/35; 346/2; 347/43, 106, 107; 385/128, 141; 427/163.2, 261, 265, 266, 407.3, 409, 424, 58, 162, 558; 118/313–366, 642

[56] References Cited

U.S. PATENT DOCUMENTS

| 4,503,437 | 3/1985 | Katzschner | 346/2 |
| 4,554,179 | 11/1985 | Roderburg | 427/261 X |
| 5,074,643 | 12/1991 | Petisce | 385/141 X |
| 5,330,786 | 7/1994 | Wanaka et al. | 427/163.2 |
| 5,505,988 | 4/1996 | Taaskanen et al. | 427/163.2 |

FOREIGN PATENT DOCUMENTS 3142374  10/1984  Germany .

*Primary Examiner*—Michael Lusignan
*Attorney, Agent, or Firm*—Hill, Steadman & Simpson

[57] ABSTRACT

A method and apparatus for forming color identifiers for a lead includes a mechanism for surrounding an outer surface of a lead, which may be an optical lead or an electrical lead, with a primer coating, a mechanism for injecting either drops of paint or a line of paint into the still unhardened coating followed by a mechanism for drying the primer coating with the integrated paint.

24 Claims, 2 Drawing Sheets

METHOD AND APPARATUS FOR APPLYING COLOR IDENTIFIERS TO A LEAD

BACKGROUND OF THE INVENTION

The present invention is directed to a method and apparatus for applying color identifiers to an electrical or optical lead.

U.S. Pat. No. 4,503,437, whose disclosure is incorporated herein by reference thereto and which claims priority from German Application 31 42374, discloses that color spots from a plurality of nozzles of an ink printer can be sprayed onto a lead in overlapping rows so that the cross sectional profile of the color application formed by the color spots comprises a gradual rise up to a maximum value and, subsequently, a gradual decrease. Such color spots applied multi-layer above one another project irregularly toward the outside with reference to the outside circumference of the leads, so that an undesired fluctuation in the diameter occurs without additional after-treatments. Thus, for example, a colorless lacquer, or a clear lacquer, must be subsequently applied onto the lead in order to close the gaps between the color applications after their application. The color spots, as well as the clear lacquer, thereby remain on the lead essentially as two separate layers, as a result whereof an undesirable abrasion or stripping of the color identifiers and/or of the clear lacquer can potentially occur. In addition, such a method of application causes the color spots to flow together so that only an unsharp color identifier may be potentially formed. Since the color spots are applied overlapping in this known method of application, a relatively great consumption of color material occurs in term of quantity.

SUMMARY OF THE INVENTION

The present invention is based on the object of disclosing a method for providing an elongated, electrical or optical lead with color identifiers in a simple way with optimum efficiency.

To accomplish these goals, the method includes that the lead is surrounded with a primer coating in a coating mechanism in a first working cycle, that microscopically fine individual or interconnected paint droplets from at least one color jet or nozzle mechanism are projected at the lead with the still unhardened primer coating and that these paint droplets are largely integrated into the primer coating and in that only then is the primer coating together with the paint droplets introduced into a following drying mechanism.

In that microscopically small or, respectively, fine paint droplets, either individually or interconnected together from at least one paint jet, are largely integrated into the primer coating for color identification, an essentially uniform as well as homogeneous color coating of the respective lead will be obtained. Irregularities or fluctuations in the thickness of the application of the color coat are thus largely avoided, for example the lead comprises essentially the same respective cross sectional shape, in particular an approximately constant diameter as viewed in the longitudinal direction. Due to the optimally far-reaching embedding of the individual paint droplets and/or paint jets into the primer coating, an intimate union between the color material of the paint droplets or, respectively, of the respective paint jet and the coating material of the primer coating is produced. For example, an abrasion of the color identification is reliably avoided in this way. As a result of the optimally far-reaching integration of the paint droplets or, respectively, of the respective paint jet into the basic layer of the primer coating that has not yet hardened, a practically uniform coating of the lead occurs with mechanical properties that essentially correspond to those of the coating with a single coating material. In this way, the lead coated with color material in this manner exhibits largely the respectively same material properties in the longitudinal direction as well as around the circumference thereof.

Preferably, microbending is thus largely avoided given optical leads, particularly light waveguides. Due to the essentially constant outer diameter of the respective, color-coated lead in the longitudinal direction, modifications of the electrical coupling values between neighboring leads given electrical leads, for example after being stranded, are likewise largely advantageously avoided.

In particular, the identifier color or paint comprises the same material properties as the primer coating. Various color pigments, such as, for example, black, white, etc., are thereby preferably added to the primer coating and/or to the identifier color or paint.

The invention is also directed to an apparatus for the inventive application of color identifiers onto an electrical or optical lead that is characterized in that a coating mechanism having a coating channel is provided in which the lead is passed therethrough to receive a primer coating on the lead. The coating mechanism is immediately followed by at least one nozzle mechanism for a color or paint material and in that the nozzle mechanism comprises at least one nozzle head such that microscopically small paint droplets can be output individually or in a connected sequence as at least one paint jet in the direction onto the primer coating and can be introduced therein.

In order to be able to also color-code the fibers in a circumferential direction, particularly by 360°, two or more application nozzles are expediently arranged around the outside circumference of the lead and offset in a circumferential direction.

Other advantages and features of the invention will be readily apparent from the following description of the preferred embodiments, the drawings and claims.

DESCRIPTION OF THE PREFERRED EMBODIMENTS

Figure 1:
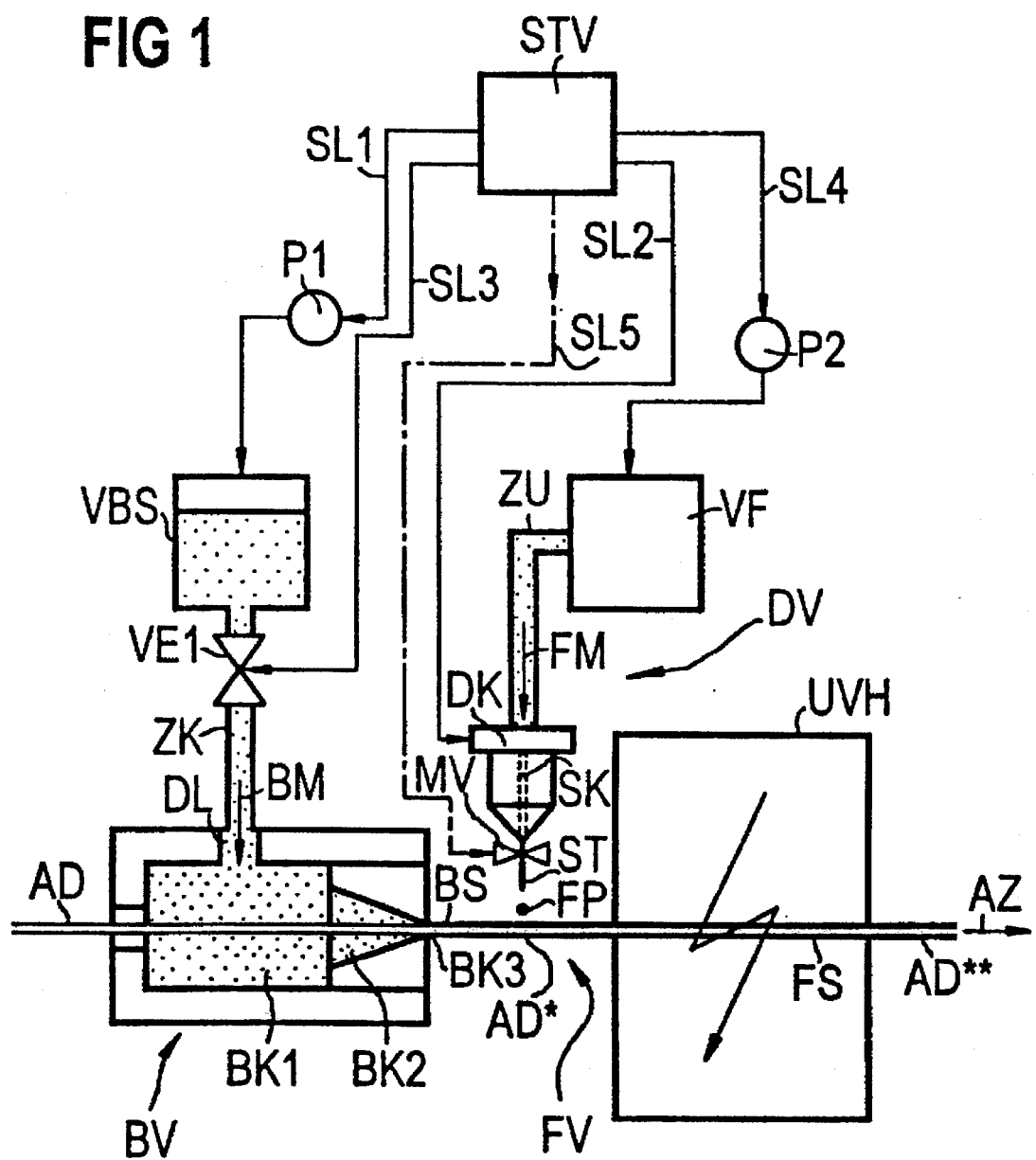
FIG. 1 is a schematic diagram of an apparatus for the implementation of the present invention.

The principles of the present invention are particularly useful in the apparatus, generally indicated at FV in FIG. 1, for applying a color identifier on an electrical or optical lead AD.

As illustrated in FIG. 1, the elongated, electrical or optical lead AD is transported through the apparatus FV for applying color identifiers on a straight line in a haul-off direction AZ, i.e., from the left to the right of FIG. 1. The lead AD passing through in the haul-off direction can be a bare electrical conductor, such a metallic bare wire, an insulated electrical conductor or a light waveguide. In particular, the lead AD comprises an approximately circular-cylindrical form or shape. The lead AD first enters into a coating mechanism BV that serves for the base coating of the lead AD with a primer coating BS. Ultraviolet-curing materials, such as, for example, ultraviolet paints or PVC solvent paints are preferably selected for the primary or primer coating BS. Potentially, the primer coating BS can also be simultaneously applied onto the lead AD as a protective sheath, particularly as an insulating material given electrical leads.

In the coating mechanism BV, as viewed in the haul-off direction AZ, the lead AD passes through a first, elongated coating chamber BK1 at an input side, which chamber is essentially cylindrical, particularly a circular-cylindrical fashion. This cylindrical coating chamber BK1 is followed by a sub-region or second chamber BK2 which tapers in the haul-off direction AZ. This second sub-region BK2 is preferably conically fashioned. Expediently, the second chamber BK2 comprises a cone angle on the order of magnitude of between 5° to 30°, and preferably in a range of 10° to 20°. The second chamber BK2 tapering in the haul-off direction AZ thus forms a type of nozzle-like coating channel for the primer coating of the lead AD. The second or sub-region BK2 has an exit aperture or orifice BK3, so that the primer coating BS can be applied onto the lead AD with a prescribable, defined application thickness for priming. To that end, the nip between the inside edge of the exit aperture BK3 and the outside surface of the lead AD is expediently selected to that it essentially corresponds to the desired application thickness or coat thickness of the primer coating BS on the lead AD. The chromatic material BM of the primer coating BS is supplied to the first coating chamber BK1 of the input side through a trans-axially applied admission aperture DL via a feeder conduit ZK, preferably under pressure. The chromatic material BM for the primer coating of the lead AD is thereby kept on hand in the first coating chamber BK1 and is dragged along or, respectively, entrained by the lead AD pulled through in the haul-off direction AZ. It is thus entrained by the haul-off motion of the lead AD in the throughput direction AZ from left to right and, due to the channel cross section decreasing in the throughput direction AZ in the preferably conically tapering, second coating chamber BK2, the material is stretched onto the outside circumference of the lead AD with a prescribable, largely defined application thickness or, respectively, layer thickness. This makes it possible to surround the lead AD with the primer coating BS, preferably all around as well as, advantageously, with approximately the same layer thickness. A base color coating is thus preferably undertaken with the coating mechanism BV, this coating comprising largely the same application thickness of the primer coating BS viewed in the circumferential as well as the longitudinal direction. The lead AD provided with the primer coating BS thus comprises essentially the same, constant outside diameter as viewed in the longitudinal direction, so that the essentially circular-cylindrical shape occurs for the pre-coated, color-primed lead.

The primer coating BS is thereby kept on hand in a reservoir VBS that is connected to the coating chamber BK1 via a valve VE1 as well as the feeder conduit ZK. The valve VE1 can be designationally closed and opened, preferably via a control line SL3 with the assistance of a control means STV. In this way, it is advantageously possible to rapidly switch from one color for the primer coming to another color in an especially easy way. Via the control line SL1, the control means STV regulates the pressure mechanism P1, which may be a pump, with which the reservoir VBS can be charged with pressure. The primer coating BS can thus be expressed into the coating chamber BK1 quite designationally with a predeterminable pressure, so that the largely defined coating conditions are established therein.

Expediently, the primer coating BS is applied onto the respective lead with a coating thickness, i.e., application thickness, in a range between 1 µm and 8 µm, and preferably in a range between 2 µm and 5 µm.

A transparent, i.e., optically transparent, coating compound is preferably employed as the coating material for the primer coating BS. Of course, it is also possible to lend this primer coating material a uniform coloration by adding color pigments so that the primer coat appears, for example, white, green, blue, yellow, red, etc., to the observer.

Upon departing the second coating chamber BK2, the lead with the primer coating BS is still moist, i.e., in a soft condition. In this condition, the lead is referenced AD*. In an immediately following, second working cycle, microscopically fine paint droplets are additionally individually embedded into this as yet unhardened primer coating BS of the lead AD*. A single paint droplet is shown enlarged and schematically and is referenced FP in FIG. 1. For introducing paint droplets into the still damp primer coating BS, a nozzle mechanism DV for a paint or color material FM immediately follows the coating mechanism BV. This nozzle mechanism DV comprises a nozzle head DK with which individual, microscopically fine paint or color droplets FP of the paint material FM can be output, and preferably shot or injected into the primer coating BS. Precisely-dosed, individual drop-shaped, small paint spheres are thus sprayed into the as yet unhardened, damp primer coating BS. In this way, the microscopically small paint droplets can be individually largely integrated into the still wet, i.e., damp, primer coating so that a uniform color coating with a largely constant outside diameter is obtained. The lead provided with the color identifier in this way is referenced AD in FIG. 1. Disturbing thickness portions or other irregularities on the outside circumference of the primed lead AD provided with the color identifier are thus largely avoided. For example, a largely smooth, uniform outside surface of the color-coated lead occurs in the circumferential as well as the longitudinal direction. Due to the optimally far-reaching integration of the paint droplets FP into the primer coating BS, a non-uniform thickened portion of the lead and, thus, inadmissibly high fluctuations in diameter are suppressed. Particularly given light waveguides, microbending is essentially avoided as a consequence of the uniform, for example largely constant application thickness of the primer coating BS with the paint droplets FP embedded therein. Given electrical leads, for example, in communication cables, further modifications or, respectively, fluctuations of the electromagnetic coupling values between neighboring leads, for example after stranding, along the longitudinal extent thereof are far less likely to occur. The paint droplets FP, expressed in practical terms, are precise doses which are shot into the primer coating BS with the assistance of the nozzle head DK so that a largely intimate union between the paint droplets and the primer coating BS is established. For example, the paint droplets are integrated into the primer coating BS and remain adhering therein. The primary coat of the primer coating BS is bombarded so that with the paint droplets FP, which are primarily small paint balls, press themselves as far as possible into the surface of the primary coat of the primer coating BS and embed themselves therein. An outwardly salient, local paint application at the outside circumference of the lead is essentially avoided in this manner so that a uniform coating having a largely constant layer of thickness is formed in the circumferential as well as the longitudinal direction.

What is referred to as a "microdrop" system from Microdrop-Gesellschaft für Microdosierungssysteme mbH, D 22844 Norderstedt, Mühlenweg 143 Germany is preferably employed as a nozzle mechanism DV with which the microscopically small paint droplets FP can be shot or injected into the still damp primer coating BS. This dosing system is distinguished from standard ink jet printers in that, among other things, paint material having a viscosity of up to 100 mPa sec can be employed. In addition, it is not necessary that such paints be electrically conducted. Preferably, the individual paint droplets are generated with a piezopump in the nozzle head DK which piezopump preferably works with a frequency of about 6500 Hz. In particular, such systems allow variable drip rates of 2000–6000 droplets per second.

The nozzle mechanism DV preferably generates paint droplets FP having a maximum cross sectional width or diameter in a range between 20 μm and 100 μm, preferably in a range of between 80 μm and 100 μm. In particular, they are fashioned approximately spherical, particularly drop-shaped.

The nozzle mechanism DV is expediently arranged optimally directly following the exit aperture BK3 of the coating mechanism BV in order to be able to introduce the paint droplets FP into the moist primer coating BS as immediately as possible. Preferably, the nozzle mechanism DV following the coating mechanism BV is at a distance of 20 mm to 100 mm, and preferably in a range of between 30 mm and 50 mm.

For an optimally far-reaching integration of the paint droplets FP into the primer coating BS, a viscosity that is in a range of 50–150 times lower, particularly between 80 and 120 times lower than that of the as yet unhardened primer coating BS is selected for the paint material FM of the paint droplets FP. Preferably, the coating material BM of the primer coating BS comprises a viscosity between 2000 mPa and 8000 mPa. A viscosity between 40 and 100 mPa sec, particularly in a range between 30 and 50 mPa sec, is preferably selected for the paint material FM of the paint droplets FP. Otherwise, the paint material FM for the color identification preferably comprises the same material properties as the material BM for the primer coating BS. The paint droplets are output or shot onto the lead AD*, preferably approximately in a radial direction with reference to the longitudinal axis of the lead AD*. The paint droplets FP expediently follow one another with a firing rate of at least 1500 droplets per second, for example in a range between 1000 and 10000 droplets per second, preferably in a range of 2000 to 6000 droplets per second, and are thereby integrated into the primer coating BS of the lead AD*. The paint droplets FP are thereby expediently introduced into the primary layer of the primer coating BS at a spacing between 0.1 mm and 1 mm, preferably between 0.1 mm and 0.5 mm, from one another. They preferably comprise approximately the same spacing from one to the other. In particular, ultraviolet-curing paints or paints containing PVC solvents are selected as the paint material FM for the paint droplets FP. Given employment of ultraviolet paints for the primer coating BS and/or the paint droplets FP, work can preferably be carried out with high manufacturing speeds.

In this way, it has become possible to output paint droplets onto the primer coating BS with the nozzle mechanism DV so that these form a prescribable pattern, i.e., a color identifier FS, in the primer coating BS. In particular, any desired line pattern can be produced in that the paint droplets FP are designationally arranged following one another in the longitudinal direction of the lead AD*. Preferably, the individual paint droplets are placed following one another in a row on a straight line so that an approximately solid line in the longitudinal direction of the lead AD* occurs for the viewer from a distance. Of course, it is also possible to apply a ring marking or other type of mark to the outside circumference of the lead in the same way. A coloration that differs from that of the primer coating BS is expediently selected for the paint material FM of the paint droplets FP. Thus, a visually clear visible color identification can be produced on the lead AD* with the paint droplets. In order to thus make the paint droplets visible in the primer coating, color pigments having a coloration that differs from the coloration of the pigments in the primer coating are expediently mixed with the paint material for the paint droplets. For example, the primer coating can thus be colored white, brown, yellow, etc., whereas the paint droplets are red, green, blue, etc.

The paint material FM is supplied to the nozzle mechanism DV from a reservoir VF by a delivery channel ZU. The reservoir VF can be charged with pressure by a pressure mechanism P2, such as a pump, with the control mechanism STV controlling the pump through a control line SL4. The temporal sequence of the paint droplets FP can be expediently undertaken with the control means STV via a control line SL2. The control means STV thus controls the nozzle head DK so that the paint droplets can be "fired" pulse-like in the direction onto the lead AD in a predetermined, temporal sequence, as well as defined size.

The primer coating BS and the color identification FS embedded therein are conducted in common through a curing or drying means UVH in FIG. 1 following the application procedure. It is expedient to employ optimally identifiable material for the primer coating BS as well as for the paint droplets FP in order to be able to achieve an optimally good union between the primer coating and the paint droplets. Ultraviolet-curing resins are preferably utilized for the primer coating BS as well as for the paint droplets FP, so that the drying means UVH can be fashioned as an ultraviolet lamp or source.

Figure 2:
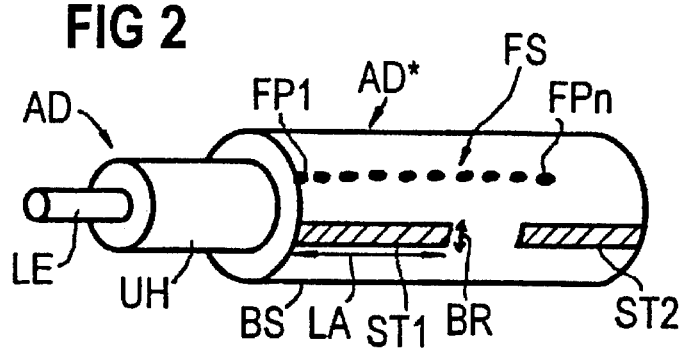
FIG. 2 is a schematic perspective view of a lead provided with a color identifier of both color droplets and a color jet or bars according to the method of the present invention.

As a final result, the color-coated lead shown in perspective in FIG. 2 is thus formed. A first sheath UH is applied on the actual, preferably approximately circular-cylindrical, electrical or optical conductor LE. This sheath UH, for example, is a plastic insulator material given electrical conductors. In the especially preferred employment of an optical fiber as an optical lead, the sheath UH is formed by what is referred to as a coating including primary and secondary coatings. The actual conductor LE as well as the protective sheath UH previously applied then form the lead AD of FIG. 1 to be provided with a color identification. A thin base coat with the color of the primer coating BS is applied all around on the lead AD with optimum uniformity, for example, preferably with the same layer thickness in the circumferential as well as in the longitudinal direction. Individual paint droplets, particularly small paint balls, FP1–FPn are incorporated or, respectively, embedded into the coating BS of this primed lead AD* so that the color identifier FS is formed overall. The individual paint droplets FP1–FPn are indicated with blackened dots in FIG. 2 for improved clarity in order to visually emphasize them compared to the primer coating BS. By way of example, these paint droplets FP1–FPn in FIG. 2 are arranged in a row on a straight line, as well as spaced from one another, particularly with identical spacing, so that an essentially straight color line FS occurs as an imaginary connection. In FIG. 2, thus, the color identifier preferably extends along a specific sub-section of the lead AD parallel to the longitudinal axis thereof. Since the paint droplets FP1–FPn respectively follow one another at a very slight spacing, they appear overall as a solid color line for a viewer from a distance.

Figure 3:
FIG. 3 is a schematic cross sectional view of a paint droplet or paint jet of color identifier of FIG. 2 embedded in the primary coating of the lead.

The paint droplet FP1, as illustrated in FIG. 3, is embedded in the base layer of the primer coating BS. An outside surface that is essentially smooth all around occurs toward the outside, for example the color application salient toward the outside due to the paint droplets FP1 is largely avoided. In particular, the paint droplet FP1 is integrated to such an extent into the basic proportion of the primer coating BS that it projects by less than 1 m, and preferably by less than 0.5 µm, toward the outside compared to the base coat of the primer coating BS. The same is true, of course, with the other paint droplets FP2–FPn, as well.

A low paint consumption preferably occurs with the inventive method, since only individual, non-overlapping paint points are applied onto the lead. In particular, low manufacturing costs occur, since only one working cycle is required for applying the respective color identification and additional after-treatments can be eliminated. In particular, a good adhesion of the identification color occurs due to the optimally far-reaching embedding of the paint droplets into the still damp primer coating.

Figure 4:
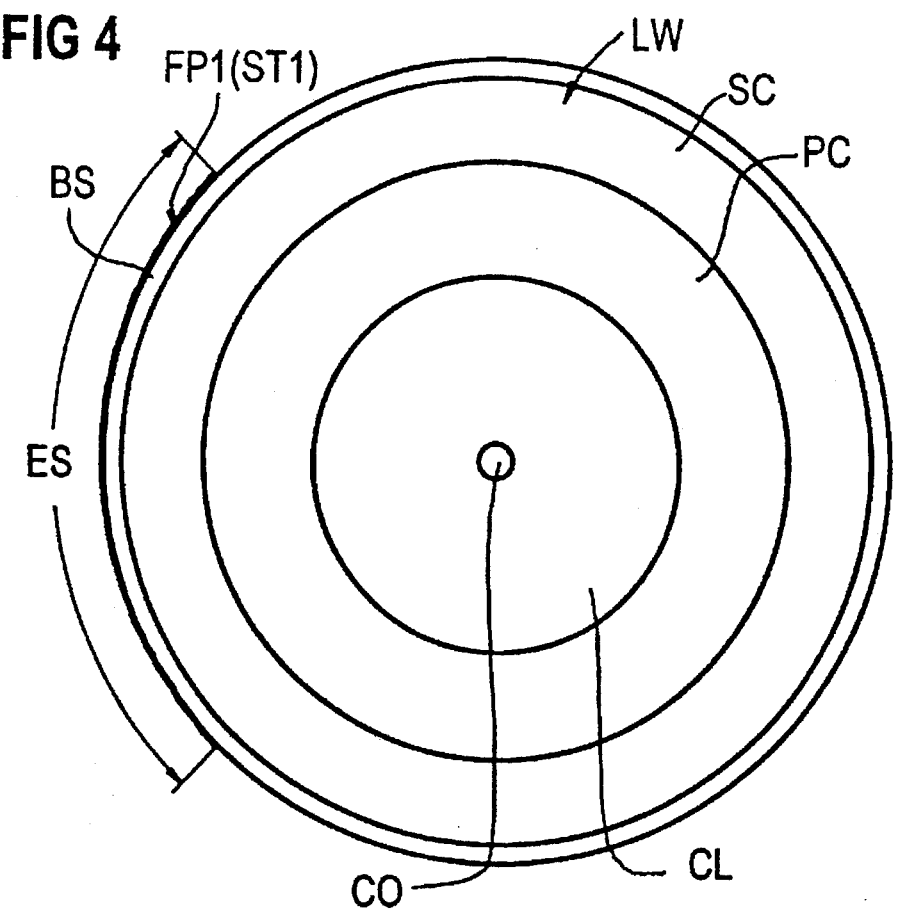
FIG. 4 is a schematic enlarged end view of a light waveguide having a color identifier according to the present invention.

FIG. 4 is an enlarged schematic end view or cross sectional view of an approximately circular light waveguide LW with a silica glass core CO with a silica glass cladding CL. A first plastic coating PC, such as a resin coating, is applied around a silica glass cladding CL. A second plastic coating SC, preferably a resin, is applied on the first plastic coating PC. The light waveguide LW formed in this way is provided with a base layer of the primer coating BS of approximately uniform thickness all around its outside circumference. For example, the paint drops FP1 of FIG. 2 or, respectively, FIG. 3, is largely embedded on a sub-section of the outside circumference of the light waveguide LW1 primed in advance in this way. The paint drop FP1 thus comprises a diameter between 1/50 and 1/2, and preferably in a range of 1/5 and 1/4 of the outside diameter of the light waveguide LW before penetrating into the primer coating BS. For example, the drop preferably comprises an expanse ES of at least 1/50–1/2, particularly at least 1/5–1/4 of the overall circumference of the color-primed light waveguide LW after being introduced into the primer coating BS, as viewed in the circumferential direction. The paint droplet FP1 in FIG. 4 has penetrated to such an extent into the inside of the color primer layer that it hardly projects therefrom and, respectively, extends over the remaining outside surface of the base layer as viewed radially outward. An essentially homogeneous, uniform color application thickness occurs in this way around the circumference. Local irregularities, for example thickened portions at the outside circumference of the light waveguide, are thus largely avoided.

At least two, for example two or more, application nozzles DK in FIG. 1 are preferably arranged along the outside circumference of the lead AD* which is passing through in the haul-off direction. These nozzles are offset relative to one another in a circumferential direction. This makes it advantageously possible to introduce two or more paint droplets into the primer coating BS next to one another in a circumferential direction of the lead AD*. Color identifiers that preferably cover at least two-thirds of the outside lead circumference and, thus, are largely visible proceeding from all sides can thus be produced. In particular, an approximately 360° all around color identification can thus be produced.

In addition to or independently of the production of individual paint droplets, it is especially expedient to output a plurality of microscopically small paint droplets, such as, for example, FP1–FPn of FIG. 2, as an interconnected paint jet or, respectively, line of paint onto the color-primed lead AD* with the assistance of a nozzle mechanism or arrangement DV of FIG. 1. To that end, the nozzle head DK expediently comprises a microstop valve or microvalve MV, whose longitudinal channel or, respectively, paint tube SK is additionally indicated with dot-dashed lines in FIG. 1. This paint tube SK extends on an essentially straight line and is preferably circular-cylindrically fashioned. Given continuous replenishment of the paint tube SK, a column of paint material always resides in the tube SK, and an approximately circular-cylindrical, thin paint jet ST is projected for a prescribable on-time therefrom by opening the microvalve MV and the jet is cut-off by closing the microvalve MV. The paint tube with the microvalve MV thus operates in the fashion of a microsyringe.

The microvalve MV can be opened and closed with the control means STV via a control line SL5 that is illustrated in dot-dashed lines in FIG. 1. The microvalve MV is preferably actuated with a periodicity between 50 Hz and 500 Hz, and preferably between 50 Hz and 100 Hz. A paint jet is thus output with this periodicity. The paint tube SK is supplied with paint material FM by the delivery channel ZU, so that it always remains filled. With an opened microvalve MV, thus, an endless paint jet would be projected onto the lead. The paint jet or, respectively, paint line, such as, for example, ST, having a prescribable length that is composed of interconnected paint droplets is output by interrupting or cutting off the column of paint material continuously flowing through the tube SK when the microvalve MV is open.

FIG. 2 additionally shows two color lines ST1, ST2 produced in this way on the lead AD* having a respective color area that is continuous, i.e., interconnected, in a longitudinal direction, particularly a narrow, rectangular color area. The two color lines ST1 and ST2 follow one another spaced in the longitudinal direction. Their inking or color expediently differs from the coloration of the main color of the primer coating in order to make them visible in the primer coating. In the black-and-white drawing of FIG. 2, they are respectively identified by shading for the sake of graphic simplicity and in order to visually contrast them with the primer coating BS. They preferably respectively extend approximately in a straight line in the longitudinal direction. The inside diameter of the paint tube SK of FIG. 1 is expediently selected so that the respective paint jet, such as, for example, ST1 and ST2, is output onto the primer coating BS with a jet width BR, preferably between 20 µm and 100 µm, and even more preferably between 80 µm and 100 µm. This paint strip ST1 is thus embedded into the coating BS. Paint jets having a prescribable jet or, respectively, line length LA, particularly between 2 mm and 10 mm, and more preferably between 3 mm and 5 mm, can thus be advantageously output onto the primer coating BS with the assistance of the microvalve MV of FIG. 1.

In order to be able to output microscopically fine paint droplets interconnected, such as a paint jet from the nozzle DK of FIG. 1, what is referred to as a "microjet system" sold by Microdrop-Gesellschaft far Microdosierungssysteme mbH, D 22844 Norderstedt, Mühlenweg 143 is preferably employed.

Cavitation effects can be largely avoided by employing such a "microjet system", i.e., the paint tube with appertaining microvalve as schematically illustrated in FIG. 1. Since paint material in the form of a stationary column of paint material is continuously kept on hand with the assistance of the paint tube ST of FIG. 1, gas bubbles or air inclusions are largely prevented from proceeding into the tube ST and leading to the undesirable tearing or break-up of the paint jet.

The cross sectional views of FIGS. 3 and 4 show such a paint jet as, for example, ST1 being embedded into the primer coating BS. It comprises essentially the same cross sectional width BR as the individual paint droplet FP1. The integration into the primer coating occurs analogous to the individual paint droplets, for example FP1–FPn. Since the respective paint jet is formed of interconnected, individual paint droplets, an especially uniformly fashioned paint application is advantageously obtained.

Two or more "microjet systems" are preferably arranged offset around the outside circumference of the lead AD* of FIG. 1 in order to be able to identify the lead AD* in a circumferential direction. In particular, so many "microjet systems" are distributed around the outside circumference of the lead AD* that a 360° all around color identification is enabled insofar as possible. In particular, at least two-thirds of the outside lead circumference are covered by paint material in order to make the respective color markings optimally visible from the outside.

Although various minor modifications may be suggested by those versed in the art, it should be understood that I wish to embody within the scope of the patent granted hereon all such modifications as reasonably and properly come within the scope of my contribution to the art.

I claim:

1. A method for applying color identifiers to a lead selected from a group consisting of electrical leads and optical leads, said method comprising the steps of applying a primer coming on the lead to surround the outer surface thereof, while the primer coating is still unhardened, injecting individual paint droplets of a color in a line into the unhardened primer coating from at least one nozzle arrangement, said paint droplets being integrated into the primer coating by penetrating and then drying the primer coating with the integrated paint droplets to complete the formation of the coating with color identifier.

2. A method according to claim 1, wherein the step of injecting individual paint droplets injects individual paint droplets with a firing rate of at least 1500 droplets per second.

3. A method according to claim 1, wherein the step of injecting individual paint droplets injects individual paint droplets at a rate of between 1000 and 10000 droplets per second, and preferably at a rate of 2000 to 6000 droplets per second.

4. A method according to claim 1, wherein the step of injecting individual paint droplets injects a jet of paint droplets with an output periodicity between 50 Hz and 500 Hz, and preferably in a range of 50 Hz to 100 Hz.

5. A method according to claim 1, wherein the paint has a viscosity in a range of 50 to 100 times, and preferably 80 to 100 times, lower than the viscosity of the unhardened primer coating.

6. A method according to claim 5, wherein the viscosity of the paint is in a range of 40 to 100 mPa sec and preferably in a range of 30 to 50 mPa sec.

7. A method according to claim 1, wherein the primer coating and the paint are selected from ultraviolet paints and PVC solvent paints and said step of drying includes subjecting the primer coating with the integrated paint to ultraviolet light.

8. A method according to claim 1, wherein the step of injecting paint into the unhardened primer coating includes directing the paint in a radial direction with respect to the longitudinal axis of said lead.

9. A method according to claim 1, wherein the step of injecting individual paint droplets injects paint droplets into the primer coating with a spacing between adjacent droplets in a range between 0.1 mm and 1 mm, and preferably in a range of 0.1 mm and 0.5 mm.

10. A method according to claim 1, wherein the step of injecting individual paint droplets injects paint droplets at an output with a maximum cross sectional width in a range of between 20 μm and 100 μ, and preferably in a range of 80 μm to 100 μm.

11. A method according to claim 1, wherein the step of injecting individual paint droplets injects a jet of paint droplets into the primer coating with a jet width in a range between 20 μm and 100 μm, and preferably in a range of 80 μm to 100 μm.

12. A method according to claim 1, wherein the step of injecting individual paint droplets injects a jet of paint droplets into the primer coating with a jet length between 1 mm and 10 mm, and preferably between 3 mm and 5 mm.

13. A method according to claim 1, wherein the step of applying a primer coating applies a layer with a thickness between 1 μm and 8 μm, and preferably in a range of 2 μm to 5 μm.

14. A method according to claim 1, wherein the lead is an electrical lead and the material of the primer coating is an insulating material.

15. A method according to claim 1, wherein the step of injecting the individual paint droplets injects a line of paint droplets from a nozzle arrangement having a circular-cylindrical line.

16. A method according to claim 1, wherein the step of injecting individual paint droplets injects individual paint droplets in an output essentially drop-shaped by a nozzle arrangement.

17. A method according to claim 1, wherein the step of applying the primer coating passes a lead through an orifice of a coating means for extruding a coating on the lead as it leaves the means.

18. An apparatus for applying color identifiers on a lead selected from electrical and optical leads, said apparatus including means for applying a primer coating onto said lead, said means including a coating channel with the lead being conducted therethrough, means for injecting individual paint droplets into the unhardened primer coating including a nozzle having a nozzle head to direct the paint droplets into the unhardened primer coating.

19. An apparatus according to claim 18, wherein the nozzle follows the means for coating at a spacing in a range of 20 mm to 100 mm, and preferably 30 mm to 50 mm.

20. An apparatus according to claim 18, which includes means for drying immediately follow the nozzle.

21. An apparatus according to claim 18, wherein at least two nozzles are provided around the outside circumference of the lead as it passes through the means for applying the paint droplets.

22. An apparatus according to claim 18, wherein the nozzle comprises a piezopump to produce the individual paint droplets which are inserted into the primer coating.

23. An apparatus according to claim 18, wherein the nozzle comprises a microvalve with which a jet of paint droplets jet can be inserted into the primer coating.

24. An apparatus according to claim 18, wherein immediately following the nozzle is a means for drying the primer coating with the paint droplets integrated therein, said means for drying being an ultraviolet source.

* * * * *